United States Patent
Kagan et al.

(10) Patent No.: US 12,143,396 B2
(45) Date of Patent: Nov. 12, 2024

(54) INJECTING RISK ASSESSMENT IN USER AUTHENTICATION

(71) Applicant: International Business Machines Corporation, Armonk, NY (US)

(72) Inventors: Moshe Kagan, Petach Tikva (IL); Scott Matthew Andrews, Ashmore (AU)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 17/211,981

(22) Filed: Mar. 25, 2021

(65) Prior Publication Data

US 2022/0311776 A1    Sep. 29, 2022

(51) Int. Cl.
*G06F 7/04* (2006.01)
*H04L 9/40* (2022.01)

(52) U.S. Cl.
CPC ........ *H04L 63/105* (2013.01); *H04L 63/0807* (2013.01); *H04L 63/0815* (2013.01); *H04L 63/083* (2013.01); *H04L 63/0876* (2013.01); *H04L 63/0884* (2013.01); *H04L 63/102* (2013.01); *H04L 2463/082* (2013.01)

(58) Field of Classification Search
CPC ........ G06F 21/31; G06F 21/32; G06F 21/128; G06F 21/335; H04L 9/088; H04L 2463/082; H04L 63/105; H04L 63/0807; H04L 63/0815; H04L 63/083; H04L 63/0876; H04L 63/0884; H04L 63/102
See application file for complete search history.

(56) References Cited

U.S. PATENT DOCUMENTS

| | | | |
|---|---|---|---|
| 9,705,871 B2* | 7/2017 | Engan | H04L 63/0876 |
| 10,554,624 B2 | 2/2020 | Ott et al. | |
| 10,684,847 B2* | 6/2020 | Sreenivasa | G06F 8/658 |
| 2002/0158911 A1* | 10/2002 | O'Rourke | G16H 10/60 |
| | | | 715/810 |
| 2005/0154886 A1 | 7/2005 | Birk et al. | |
| 2006/0162071 A1* | 7/2006 | Dixon | H04L 67/01 |
| | | | 5/93.1 |
| 2007/0283421 A1* | 12/2007 | Hirose | H04L 63/08 |
| | | | 726/4 |

(Continued)

FOREIGN PATENT DOCUMENTS

| | | |
|---|---|---|
| CN | 103888255 A | 6/2014 |
| CN | 105227315 A | 1/2016 |

(Continued)

OTHER PUBLICATIONS

Odirichukwu et al., Security Concept in Web Database Development and Administration—A Review Perspective, IEEE, Nov. 10, 2017, p. 383-391. (Year: 2017).*

(Continued)

*Primary Examiner* — Philip J Chea
*Assistant Examiner* — Jenise E Jackson
(74) *Attorney, Agent, or Firm* — Gavin Giraud

(57) ABSTRACT

In a method for authenticating a user, a processor receives a login request for an application. A processor directs the login request to a collection page. The collection page may include an authentication script. A processor receives a risk assessment based on an identity authenticated through the authentication script. A processor grants a level of access to the application based on the risk assessment.

24 Claims, 5 Drawing Sheets

(56) References Cited

U.S. PATENT DOCUMENTS

| | | | |
|---|---|---|---|
| 2008/0077983 A1 | 3/2008 | Meyer et al. | |
| 2009/0171905 A1* | 7/2009 | Garcia | G06F 16/382 |
| 2009/0222925 A1* | 9/2009 | Hilaiel | G06F 21/53 |
| | | | 726/25 |
| 2010/0281389 A1* | 11/2010 | Hutchinson | H04L 67/142 |
| | | | 715/736 |
| 2010/0287606 A1* | 11/2010 | Machani | G06F 21/34 |
| | | | 709/206 |
| 2011/0022582 A1* | 1/2011 | Unnikrishnan | G06F 16/951 |
| | | | 707/715 |
| 2011/0093773 A1* | 4/2011 | Yee | G06F 16/986 |
| | | | 715/234 |
| 2014/0373093 A1* | 12/2014 | Wood | G06Q 20/4016 |
| | | | 726/3 |
| 2015/0066575 A1* | 3/2015 | Baikalov | G06Q 10/0635 |
| | | | 705/7.28 |
| 2015/0188940 A1* | 7/2015 | Lapidous | H04L 63/0272 |
| | | | 726/25 |
| 2015/0237049 A1* | 8/2015 | Grajek | H04L 67/02 |
| | | | 726/7 |
| 2016/0105420 A1 | 4/2016 | Engan | |
| 2017/0093863 A1* | 3/2017 | Galtsev | H04L 63/20 |
| 2018/0041509 A1* | 2/2018 | Nair | H04L 63/029 |
| 2019/0132323 A1* | 5/2019 | Williams | H04L 63/083 |
| 2020/0154270 A1* | 5/2020 | Byington | H04L 9/083 |
| 2020/0364276 A1* | 11/2020 | Kunz | G06F 40/106 |
| 2021/0142258 A1* | 5/2021 | Noivo | G06F 11/3608 |
| 2021/0185076 A1* | 6/2021 | Miller | H04L 63/107 |
| 2021/0226987 A1* | 7/2021 | Summers | H04L 63/0815 |
| 2021/0233073 A1* | 7/2021 | Ene | G06Q 20/16 |
| 2021/0234858 A1* | 7/2021 | Nakagawa | H04W 12/06 |

FOREIGN PATENT DOCUMENTS

| | | |
|---|---|---|
| CN | 110493184 A | 11/2019 |
| CN | 111935165 A | 11/2020 |

OTHER PUBLICATIONS

Parno et al, Clamp: Practical Prevention of Large-Scale Data Leaks, IEEE, May 1, 2009, pp. 154-169. (Year: 2009).*

"Blue Coat Web Application Reverse Proxy", EdgeBlue, Oct. 28, 2020, 2 pages, <https://www.edgeblue.com/Web-App-Reverse-Proxy.asp>.

"The role of reverse proxies in protection of web applications", IT Exchange Blog, Dec. 11, 2015, 4 pages, <https://www.itexchangeweb.com/blog/the-role-of-reverse-proxies-in-protection-of-web-applications/>.

"Working with Web Application Proxy", Microsoft Docs, Aug. 31, 2016, 9 pages, <https://docs.microsoft.com/en-us/previous-versions/windows/it-pro/windows-server-2012-r2-and-2012/dn584113(v=ws.11)>.

* cited by examiner

INJECTING RISK ASSESSMENT IN USER AUTHENTICATION

BACKGROUND

The present invention relates generally to the field of user authentication for an application, and more particularly to injecting a proxy in front of the application to enable authentication using an embedded collection page with additional authentication metrics.

Many computer applications, including web applications, contain confidential, sensitive, and/or restricted subject matter that is not meant to be accessed by the general public. These computer applications may restrict access to the subject matter by requiring authentication, whereby a user verifies their identity. Authentication may involve validating personal identity documents, verifying the authenticity of a website with a digital certificate, or requiring a user to perform a login operation. In computer security, logging in is the process by which an individual gains access to a computer system by identifying and authenticating themselves. The user credentials may include some form of "username" and a matching "password." Some applications may require a second factor such as email or SMS confirmation for extra security.

SUMMARY

Aspects of an embodiment of the present invention disclose a method, computer program product, and computing system for authenticating a user. A processor receives a login request for an application. The processor directs the login request to a collection page. The collection page may include an authentication script. The processor receives a risk assessment based on an identity authenticated through the authentication script. The processor grants a level of access to the application based on the risk assessment.

DETAILED DESCRIPTION

The disclosed embodiments include devices and methods for adding authentication code snippets to applications without directly updating the login page for the application. Updating a login page for an application can be restricted for a number of reasons. For example, the application may be administered with a strict change protocol that prohibits change or increases the complexity and/or expense of changing the application. Also, applications may include an existing authentication mechanism that does not include pages that may be amended with new or additional login techniques. For example, in a single sign on (SSO) architecture the user accesses the application based on the device being approved. In such instances the user is granted access directly to the web application without visiting any login pages.

The disclosed embodiments include the addition of a risk assessment proxy program that redirects login requests for the application to a collection page with one or more authentication scripts. The authentication scripts are used to collect the additional login information for the login request. The additional information may include device information and behavioral biometric information, or any other authentication mechanism that is not already present within the application. The collection page may include a function that signals completion of the collection, and approval to submit a risk assessment request. The disclosed embodiments thus enable systems to embed the authentication scripts to authenticate the user and send a backend request for risk assessment without changing the code or updating the application directly.

Figure 1:
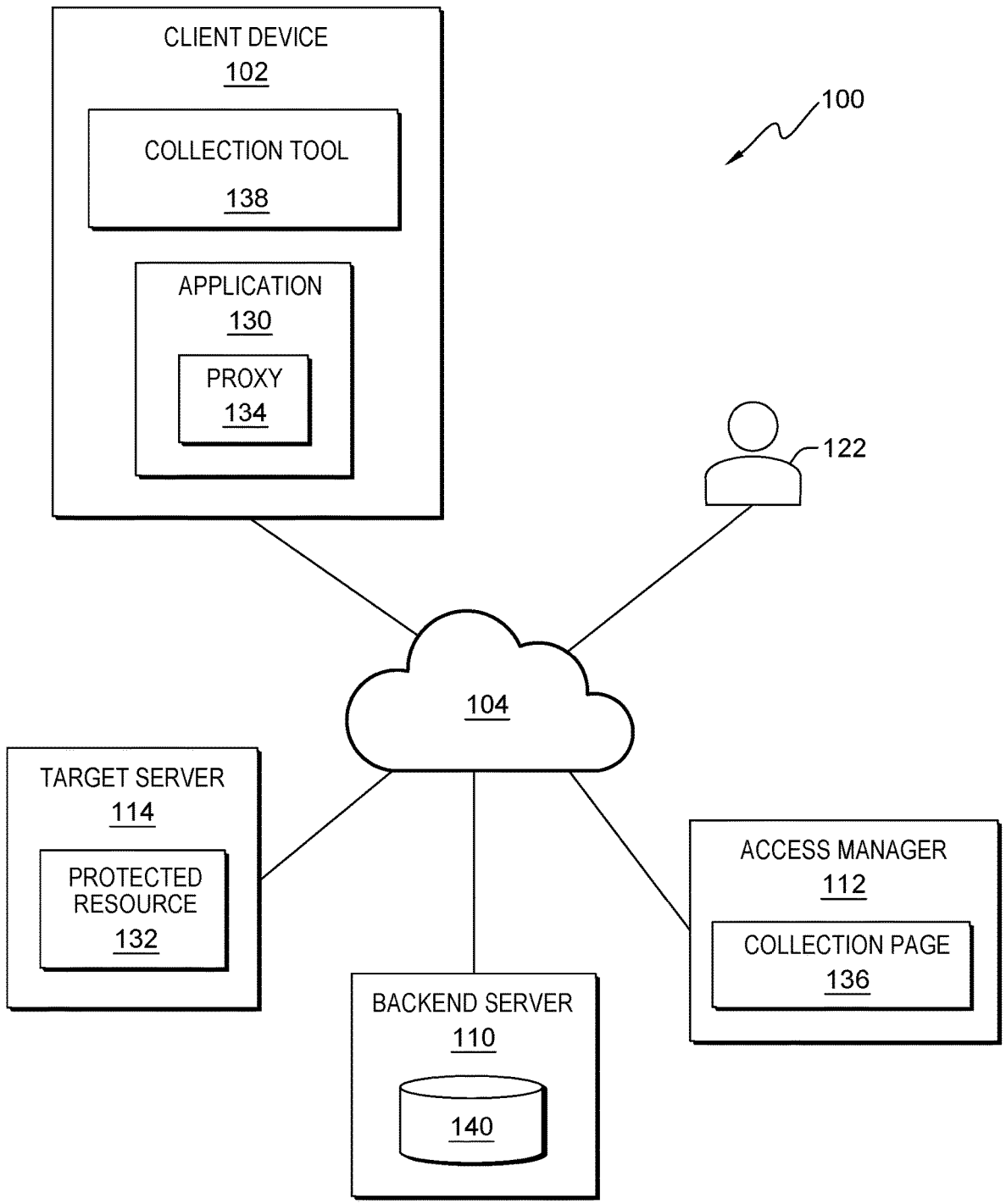
FIG. 1 depicts a diagram of a user authentication environment in accordance with one embodiment of the present invention.

Turning now to the drawings, FIG. 1 depicts a block diagram of a user authentication environment 100, according to an embodiment of the present invention. The user authentication environment 100 may include a client device 102 communicatively coupled within the user authentication environment 100 via a network 104. In some embodiments, the user authentication environment 100 may be implemented within a cloud computing environment, or use one or more cloud computing services. Consistent with various embodiments, a cloud computing environment may include a network-based, distributed/data processing system that provides one or more cloud computing services. Further, a cloud computing environment may include many computers, hundreds or thousands, or more, disposed within one or more data centers and configured to share resources over the network 104.

Figure 5:
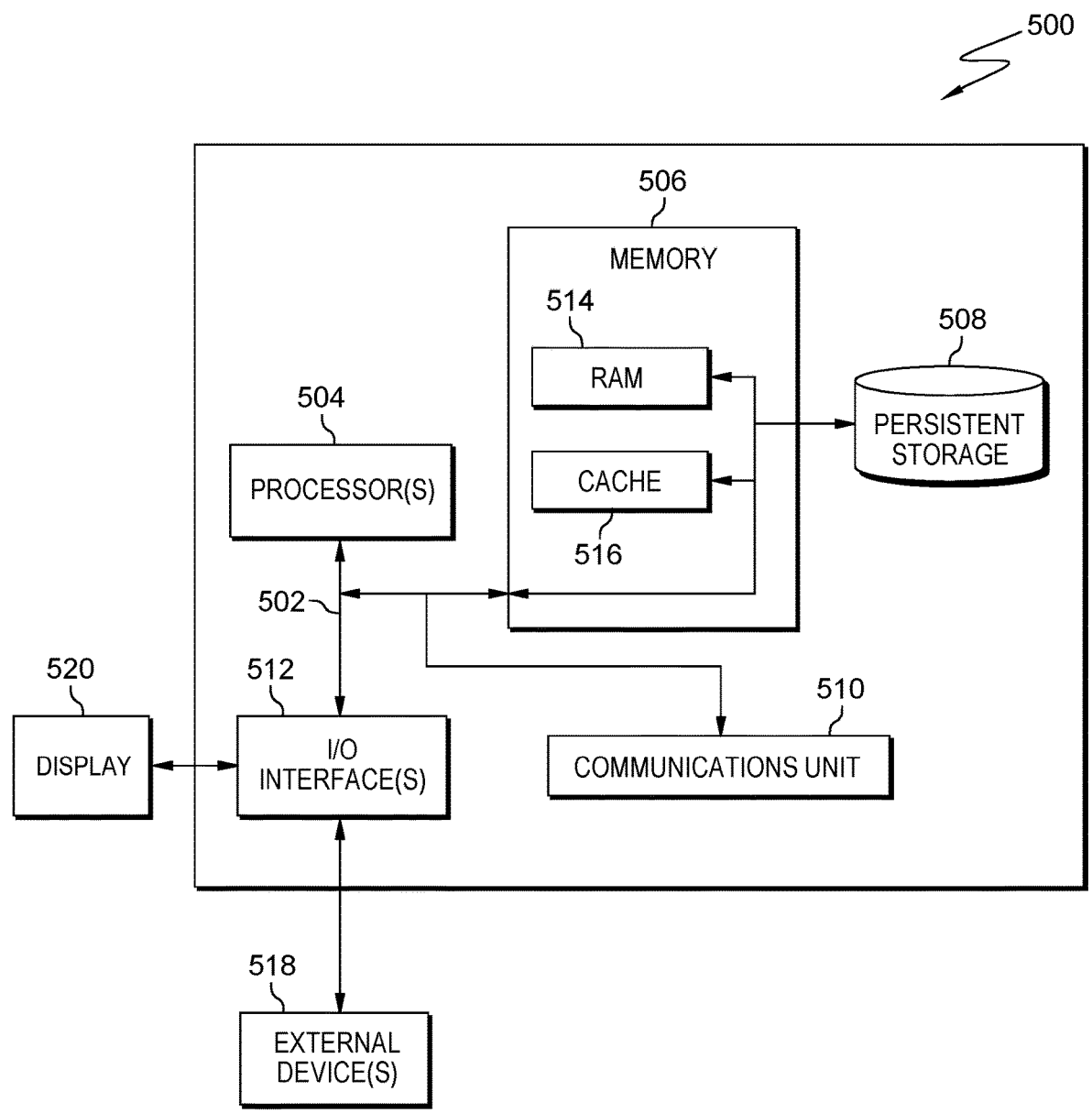
FIG. 5 depicts a block diagram of components of a computing device in accordance with one illustrative embodiment of the present invention.

The network 104 is also communicatively coupled to a backend server 110, an access manager 112, and a target server 114. In certain embodiments of the user authentication environment 100, more or fewer components may be present than illustrated in FIG. 1. For example, the user authentication environment 100 may include many additional client devices 102 that communicate with the user authentication environment 100 through the network 104. In various embodiments, some or each of the components—e.g., the backend server 110, the access manager 112, and/or the target server 114—represent separate computing devices. Each of the disclosed devices (e.g., client device 102, target server 114, access manager 112, and/or the backend server 110) may be configured the same as or analogous to the computing device 500 as illustrated in FIG. 5. In some embodiments, some or each of the components represent particular compute instances of a single computing device (e.g., program modules, computing components within a chassis, a blade server within a blade enclosure, an input/output drawer, a processor chip, etc.). For example, the access manager 112 may be combined with the backend server 110 on a single server computing device. As disclosed herein, some or each of the components of the backend server 110, the access manager 112, and/or the target server 114 may refer generally to a "server system."

A user 122 uses the client device 102 to access information through the network 104. Specifically, the user 122 loads an application 130 that accesses a protected resource 132 stored on the target server 114. Access to the protected resource 132 is monitored or managed by the access manager 112. The application 130 may include a login function requiring a username and password to grant access to the protected resource 132. In certain embodiments, the application 130 may also include a function to allow access to the protected resource 132 based on identification of the client device 102 (e.g., through a SSO page or Kerberos-enabled operating system). In some of these embodiments, the application 130 may include characteristics that cannot be updated, such as when the application 130 includes a policy that does not allow updating, or when the SSO architecture does not include a login page that can be amended. In such embodiments, the application 130 may insert a risk assessment proxy program (proxy 134) into the login process that redirects login requests for the application 130 to a collection page 136. The proxy may be logically and/or physically stored anywhere within the user authentication environment 100, but is shown acting and being accessed through the application 130. The collection page 136 may include an authentication script that enables the access manager 112 to communicate with a collection tool 138 on the client device 102.

The collection tool 138 can collect and send behavioral biometric information, device information, or multi-factor authentication information to the access manager 112. For example, the collection tool 138 may include modules that take device identifiers, or code snippets for authentication of a device fingerprint. The collection tool 138 may also include other attribute collection modules that collect various attributes of the client device 102 or attributes of a user 122. The access manager 112 may communicate with the backend server 110 to authenticate the information collected by the collection tool 138. Specifically, the backend server may include stored identifying information 140 to determine an identity associated with the information collected by the collection tool 138. The identifying information 140 includes individualized information for each profile that is looking to access the protected resource 132. This may include historic user access data (e.g., where and when the user has accessed the protected resource 132), or historic device access data (e.g., determining if this is the first time accessing the protected resource 132 from this device).

Figure 2:
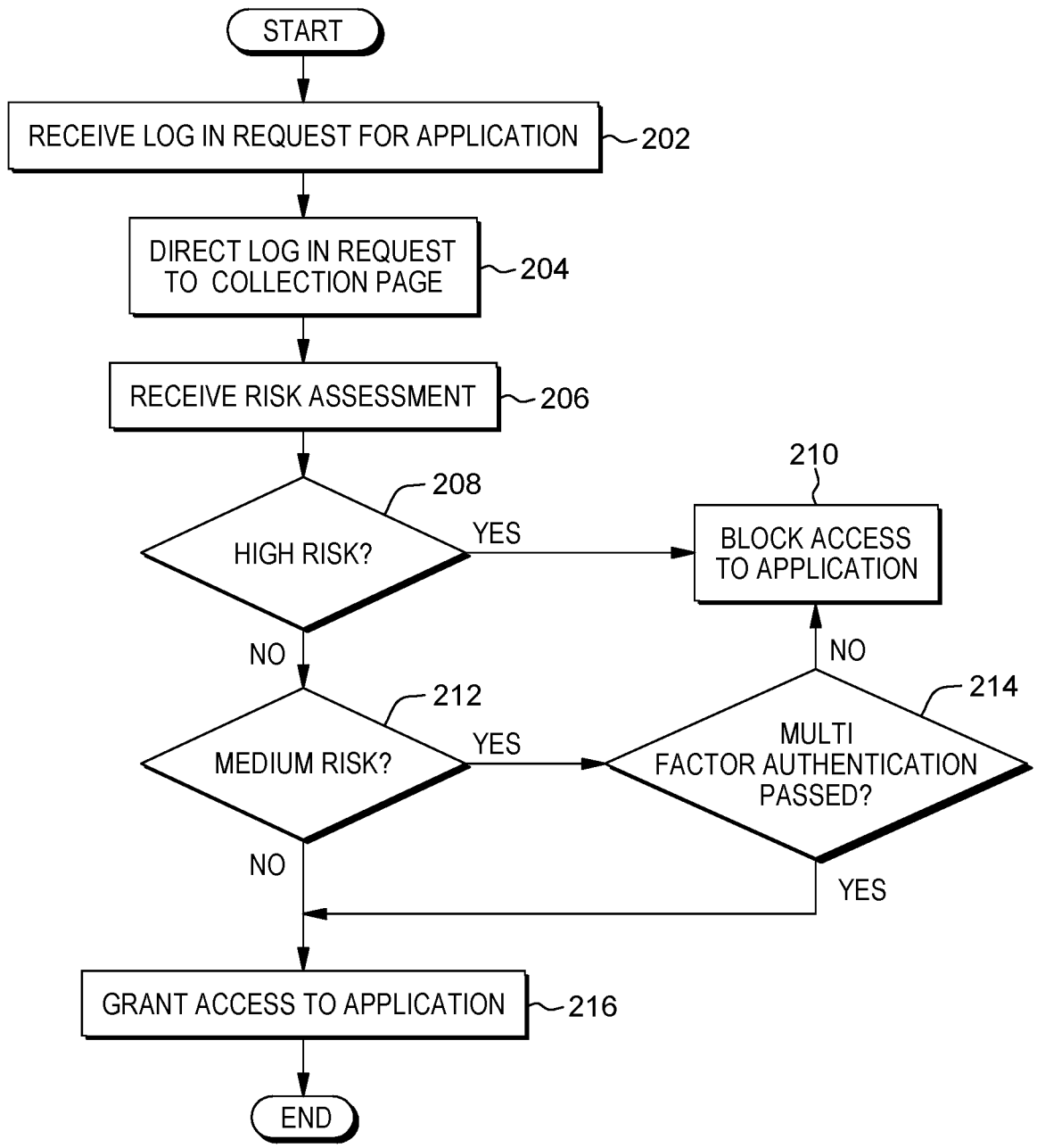
FIG. 2 depicts a flowchart of the steps of the risk assessment proxy program executing within the user authentication system of FIG. 1, in accordance with an embodiment of the present invention.

For embodiments in which the application 130 cannot be amended to update a login method, the proxy 134 is added, as described above. The proxy 134 operates a method depicted in FIG. 2. The proxy 134 receives a login request for the application 130 (block 202). The login request may be received from the client device 102 based on the user 122 selecting the application 130, or navigating to a link from a webpage hosting the application. The login request may also include a username and password, an SSO authentication scheme, or a Kerberos-enabled authentication scheme. The proxy 134 directs that login request to the collection page 136 (block 204). The collection page 136 includes one or more authentication scripts (e.g., JavaScript® code, Java and all Java-based trademarks and logos are trademarks or registered trademarks of Oracle and/or its affiliates) that collect additional user variables from the client device 102, the user 122, and/or the authentication tool 138. For example, the authentication script may collect a hashed username, user Internet Protocol (IP) address, user agent, browser information, etc. that the application 130 does not collect, and which the application 130 is not able to be programmed to collect.

Using the proxy 134 to direct the login request includes the added ability to adapt the collection page 136 to a number of various applications automatically. Specifically, the proxy 134 may utilize a server-side technology to select from a plurality of collection pages 136 through configuration of the proxy 134. That is, the proxy 134 may be programmed to direct the login request to several possible collection pages 136 depending on the user 122, client device 102, application 130, or other factors. Additional collection pages 136 may be created and/or customized to particular applications 130 based on templates implemented for other applications. Furthermore, customizing the login procedure of the proxy 134 may include a client-side approach where the authentication scripts are amended to manipulate and adapt the collection page 130. The proxy 134 may therefore be added to an enterprise environment, and the user 122 can use the proxy 134 to login to a large number of applications 130. This one-page solution can serve all of the applications allowing for a risk assessment to be done with relative ease and streamlined implementation.

Once the authentication scripts collect the additional information, the collection page 136 may submit the collected identifiers to the backend server 110, or lookup information directly on the backend server 110. For example, the backend server 110 may include opaque, non-personally identifiable profiles for each user 122 that is authorized to access the application 130. The collection page 136 uses the information from the backend server 110 to determine a risk assessment associated with the user 122. For example, the risk assessment may include allowing the user to access the application, denying access to the application, or requesting a multi-factor authentication.

The proxy 134 then receives the risk assessment from the collection page 136 (block 206) and makes a determination as to whether the user 122 poses a high risk (block 208). If the user 122 is determined to pose a high risk (block 208 "Yes"), then the user 122 is blocked access to the application (block 210). A high risk may be determined if the user 122 does not have a profile on the backend server 110, the profile does not contain sufficient information, and/or the information or the user profile indicates that the user 122 should not be granted access to the application. If the user 122 does not pose a high risk (block 208 "No"), the proxy 134 may also determine whether the user 122 poses a medium risk (block 212). If the user 122 does pose a medium risk (block 212 "Yes"), then the proxy 134 uses a multi-factor authentication process (block 214). Risk levels such as medium and high risk are configurable based on desired security attributes for protecting the protected resource 132. For example, in certain embodiments the proxy 134 may determine a medium risk if the user 122 attempts to log in from a client device that has never been recognized. In other embodiments, a log in from an unrecognized client device could be determined to pose a high risk.

In certain embodiments of the present invention, the proxy 134 may be configured to take a variety of actions based on the risk level. The illustrated option may be one configuration for an application 130 having one level of sensitivity/confidentiality. The level of sensitivity/confidentiality may be based on business (e.g. organizational policy) or regulatory (e.g. OpenBanking) requirements. For example, a low risk application 130 like a travel booking site may include a proxy 134 that is configured to allow a medium risk user 122 to login directly without multi-factor authentication to view booking options. When the user 122 attempts to actually book the trip, then the user 122 would trigger a higher standard, and since they have been detected as medium risk, the proxy 134 would require the user 122 to complete the multi-factor authentication process at that point. The multi-factor authentication process may ask for additional information, metrics, or confirmation from the client device 102, or a different device to ensure that the medium level of risk is mitigated. If the multi-factor authentication is not passed (block 214 "No"), then the proxy 134 blocks access to the application 130. If the multi-factor authentication is passed (block 214 "Yes"), or if the risk assessment is less than medium (block 212 "No"), then the proxy 134 grants access to the application 130 (block 216).

Figure 3:
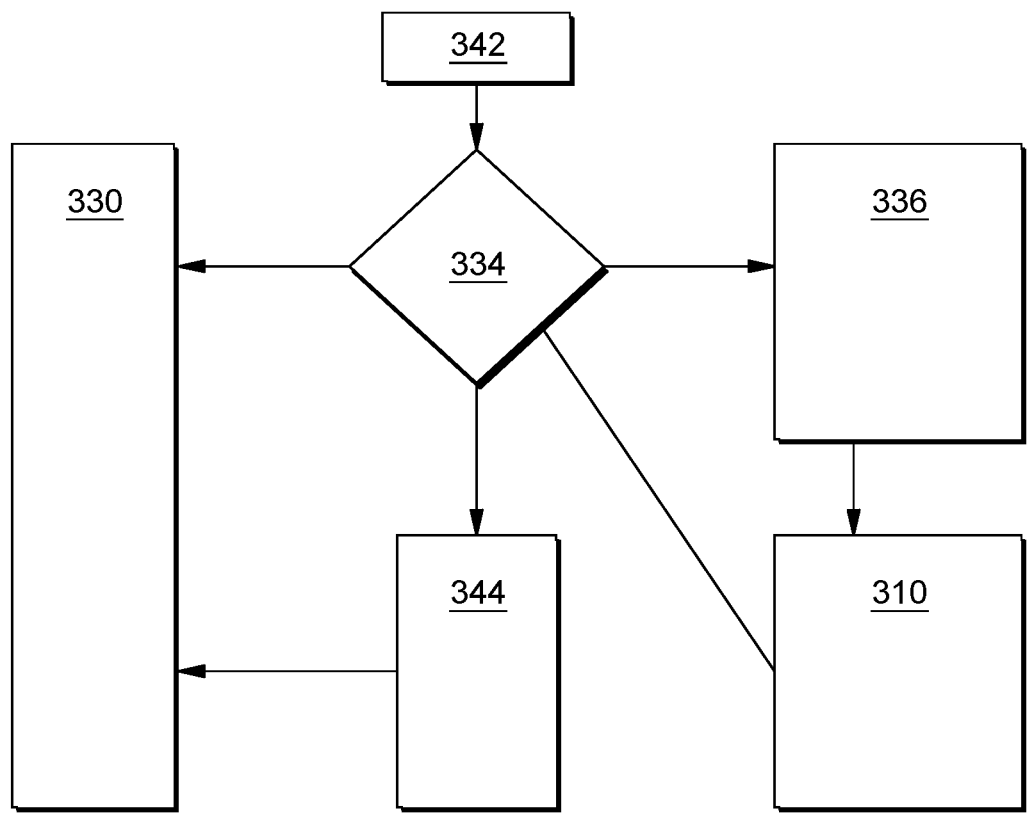
FIG. 3 depicts a visual representation of a login procedure determined by the risk assessment proxy program, in accordance with one embodiment of the present invention.

FIG. 3 depicts a visual representation of a user authentication procedure determined by the risk assessment proxy program, in accordance with one embodiment of the present invention. A login request 342 is generated by a user when the user uses a client device to initiate user authentication procedures for an application 330. The login request 342 is received by a proxy 334 that has been injected into the user authentication procedure for the application 330. The proxy 334 may determine a primary risk level based on the login request 342. For example, the proxy may determine that the login request 342 may be initiated from a particular location, such as an on-site work location. If the primary risk level is low enough, the proxy 334 may approve the login request 342 and grant access to the application 330 without further request for information. In other circumstances where the primary risk level is not approved for immediate access, the proxy 334 directs the login request to a collection page 336 that may request additional information from the client device that sent the login request 342. The collection page 336 may also access information from a backend server 310 that contains information for determining a risk assessment. The proxy 334 receives the risk assessment and grants access to the application 330, or directs the login request 342 to a multi-factor authentication page 344 which may subsequently enable the proxy 334 to grant access to the application 330.

Figure 4:
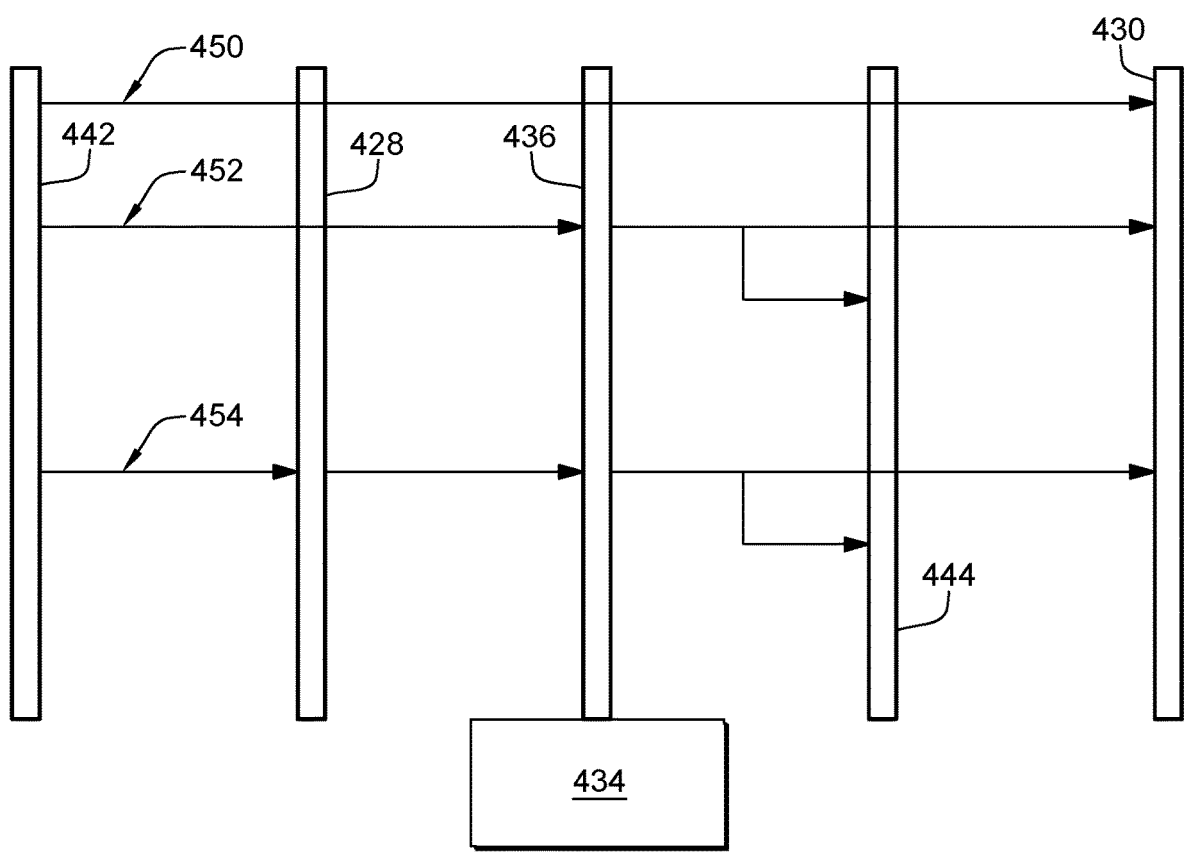
FIG. 4 depicts a visual representation of a login procedure determined by the risk assessment proxy program, in accordance with one embodiment of the present invention.

FIG. 4 depicts login procedures for several embodiments of the present invention. A first login procedure 450 includes a SSO/Kerberos scheme without a proxy 434. The first login procedure 450 proceeds from the login request 442 to accessing the application 430, without any possibility of performing risk assessment. A second login procedure 452 includes an SSO/Kerberos scheme with the proxy 434 inserted into the login procedure. The proxy 434 directs the login request 442 to a collection page 436 which uses information from the login request 442 to conduct a risk assessment. Depending on the level of risk determined at the collection page 436, the second login procedure 452 will either proceed to the application 430 or proceed to a multi-factor authentication page 444. The second login procedure 452 may also proceed from the multi-factor authentication page 444 to the application 430 if the multi-factor authentication page 444 approves the login request 442.

A third login procedure 454 does not use a SSO/Kerberos scheme, and may therefore include a login page 428 that takes a username and password. The third login procedure 454 may still include the collection page 436 to conduct further risk assessment for whether the login request 442 should be directed to the multi-factor authentication page 444. While additional login steps may be included within the scope of the disclosed embodiments, the first login procedure 450, the second login procedure 452, and the third login procedure 454 illustrate that the addition of the proxy 434 increases the adaptability of the risk assessment for logging in to the application 430.

FIG. 5 depicts a block diagram of components of a computing device 500 in accordance with an illustrative embodiment of the present invention. As described above, the computing device 500 may represent any of the devices (e.g., client device 102, target server 114, access manager 112, and/or the backend server 110) described above, or a combination of the devices, in the embodiments where the devices are embodied as components of a single computing device 500. It should be appreciated that FIG. 5 provides only an illustration of one implementation and does not imply any limitations with regard to the environments in which different embodiments may be implemented. Many modifications to the depicted environment may be made.

The computing device 500 includes communications fabric 502, which provides communications between RAM 514, cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

The software components (e.g., proxy, application, access manager, collection page, authentication tool, or multi-factor authentication page) may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. The proxy, application, access manager, collection page, authentication tool, or multi-factor authentication page may be downloaded to persistent storage 508 through communications unit 510.

I/O interface(s) 512 allows for input and output of data with other devices that may be connected to the computing device 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention (e.g., proxy, application, access manager, collection page, authentication tool, or multi-factor authentication page) can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for authenticating a user, comprising:
   receiving a login request for an application, wherein the application controls access only to a protected resource remote from a user, without an ability to control access to resources that are not the protected resource;
   selecting a collection page from a plurality of collection pages stored on a server and customized to particular applications, wherein the collection page is selected based on the application for which the login request is received;
   directing the login request to the collection page, wherein the collection page comprises an authentication script requesting log-in information that the application does not collect;
   receiving a risk assessment based on an identity authenticated through the authentication script; and
   granting a level of access to the application based on the risk assessment.

2. The method of claim 1, wherein the login request comprises a selection from the group consisting of: (i) a username and password, (ii) a single sign on (SSO) authentication scheme, and (iii) a Kerberos-enabled authentication scheme.

3. The method of claim 1, wherein the login request comprises information identifying the application.

4. The method of claim 1, comprising selecting between the plurality of collection pages based on a selection from the group consisting of: a user identity, a client device, and the application.

5. The method of claim 1, wherein the authentication script collects a user variable comprising a selection from the group consisting of: a hashed username, a user IP address, a user agent, and a browser.

6. The method of claim 1, wherein the risk assessment is received from a backend server comprising an opaque, non-personally identifiable profile associated with the identity.

7. The method of claim 1, wherein the level of access comprises a selection from the group consisting of: allowing the user to access the application, denying access to the application, and requesting a multi-factor authentication.

8. The method of claim 1, comprising determining a primary risk level based on the login request.

9. A computer program product for authenticating a user, the computer program product comprising:
   one or more computer-readable storage media and program instructions stored on the one or more computer-readable storage media, the program instructions comprising:
      program instructions to receive a login request for an application, wherein the application controls access only to a protected resource remote from a user, without an ability to control access to resources that are not the protected resource;
      program instructions to select a collection page from a plurality of collection pages stored on a server and customized to particular applications, wherein the collection page is selected based on the application for which the login request is received;
      program instructions to direct the login request to the collection page, wherein the collection page comprises an authentication script requesting log-in information that the application does not collect;
      program instructions to receive a risk assessment based on an identity authenticated through the authentication script; and
      program instructions to grant a level of access to the application based on the risk assessment.

10. The computer program product of claim 9, wherein the login request comprises a selection from the group consisting of: (i) a username and password, (ii) a single sign on (SSO) authentication scheme, and (iii) a Kerberos-enabled authentication scheme.

11. The computer program product of claim 9, wherein the login request comprises information identifying the application.

12. The computer program product of claim 9, wherein the authentication script comprises a code snippet for authenticating a device fingerprint.

13. The computer program product of claim 9, wherein the authentication script collects a user variable comprising a selection from the group consisting of: a hashed username, a user IP address, a user agent, and a browser.

14. The computer program product of claim 9, wherein the risk assessment is received from a backend server comprising an opaque, non-personally identifiable user profile associated with the identity.

15. The computer program product of claim 9, wherein the level of access comprises a selection from the group consisting of: allowing the user to access the application, denying access to the application, and requesting a multi-factor authentication.

16. A computer system for authenticating a user, the computer system comprising:
   one or more computer processors, one or more computer-readable storage media, and program instructions stored on the computer-readable storage media for execution by at least one of the one or more processors, the program instructions comprising program instruction to:
      program instructions to receive a login request for an application, wherein the application controls access only to a protected resource remote from a user, without an ability to control access to resources that are not the protected resource;
      program instructions to select a collection page from a plurality of collection pages stored on a server and customized to particular applications, wherein the collection page is selected based on the application for which the login request is received;
      program instructions to direct the login request to the collection page, wherein the collection page comprises an authentication script requesting log-in information that the application does not collect;
      program instructions to receive a risk assessment based on an identity authenticated through the authentication script; and
      program instructions to grant a level of access to the application based on the risk assessment.

17. The computer system of claim 16, wherein the login request comprises a selection from the group consisting of: (i) a username and password, (ii) a single sign on (SSO) authentication scheme, and (iii) a Kerberos-enabled authentication scheme.

18. The computer system of claim 16, wherein the login request comprises information identifying the application.

19. The computer system of claim 16, wherein the authentication script comprises a code snippet for authenticating a device fingerprint.

20. The computer system of claim 16, wherein the risk assessment is received from a backend server comprising an opaque, non-personally identifiable user profile associated with the identity.

21. The system of claim 16, wherein the level of access comprises a selection from the group consisting of: allowing the user to access the application, denying access to the application, and requesting a multi-factor authentication.

22. A computer-implemented method for authenticating a user, comprising:
  inserting a proxy into a login procedure for an application configured to only access a protected resource, wherein the proxy (i) selects a collection page from a plurality of collection pages stored on a server and customized to particular applications, wherein the selection is based on the application using the login procedure, and (ii) accesses the collection page comprising an authentication script requesting log-in information that the application does not collect;
  conducting a risk assessment based on identity information collected on a client device running the application;
  granting a level of access to the application based on the risk assessment.

23. The method of claim 22, wherein the level of access comprises a selection from the group consisting of: allowing the user to access the application, denying access to the application, and requesting a multi-factor authentication.

24. The method of claim 22, comprising selecting between the plurality of collection pages based on a selection from the group consisting of: a user identity, a client device, and the application.

* * * * *